April 2, 1940.  A. M. HEXDALL  2,195,568
MULTIPURPOSE TOOL
Filed June 25, 1938  2 Sheets-Sheet 1
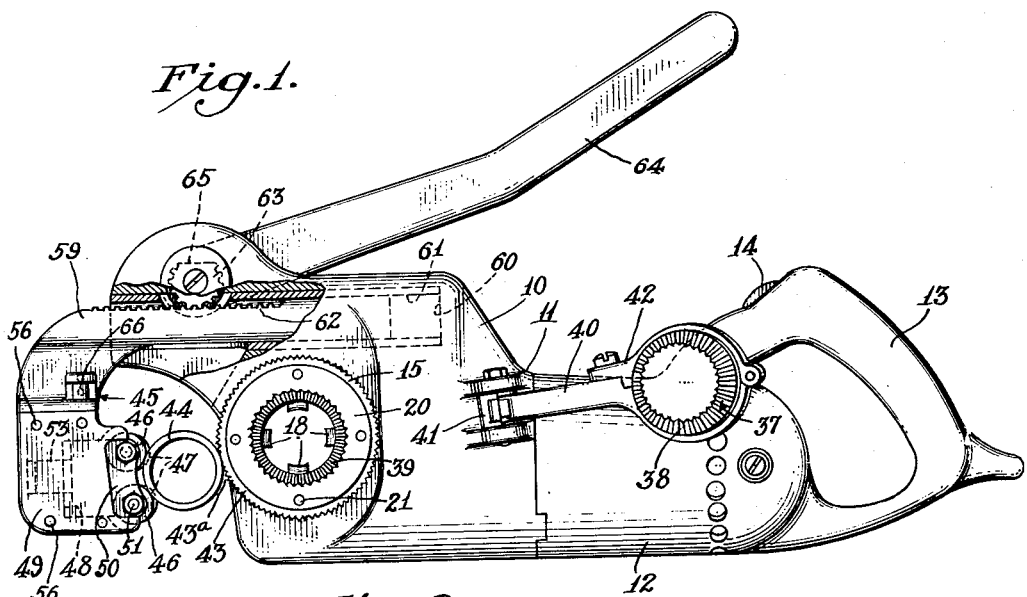
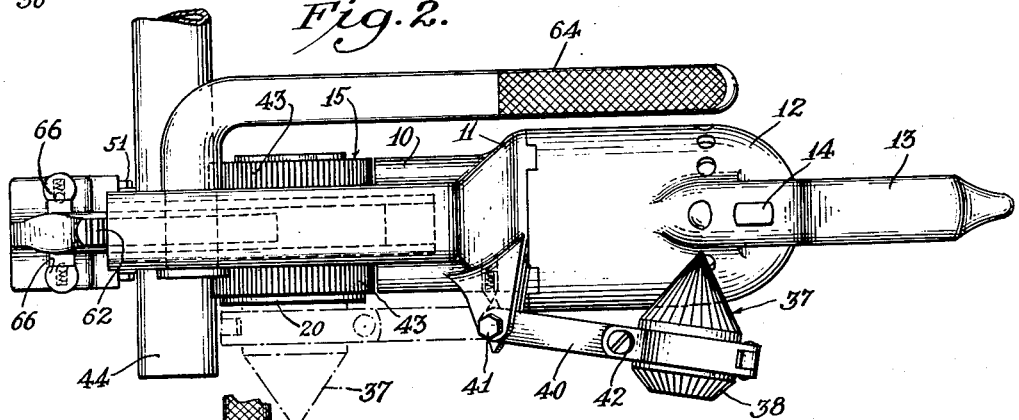
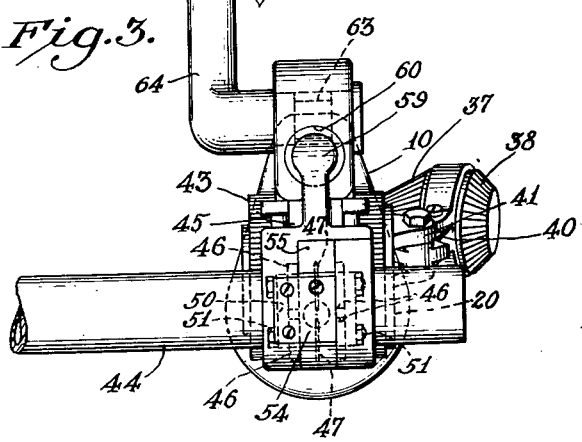
Inventor
Andrew M. Hexdall
BY
Parker, Carlson, Pitzner & Hubbard
Attorneys.

April 2, 1940.  A. M. HEXDALL  2,195,568
MULTIPURPOSE TOOL
Filed June 25, 1938  2 Sheets-Sheet 2
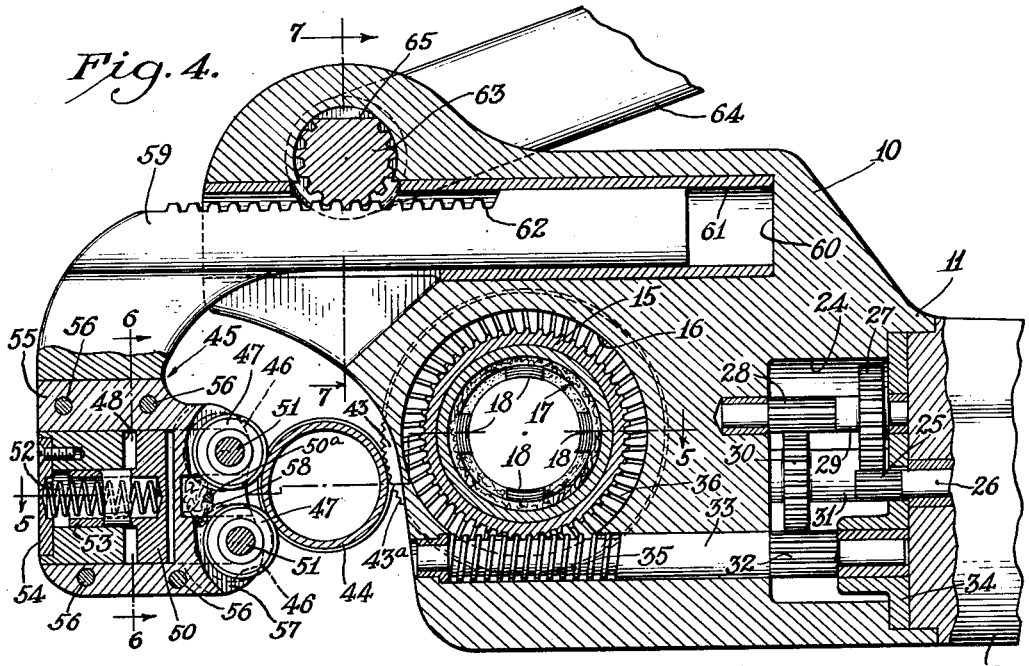
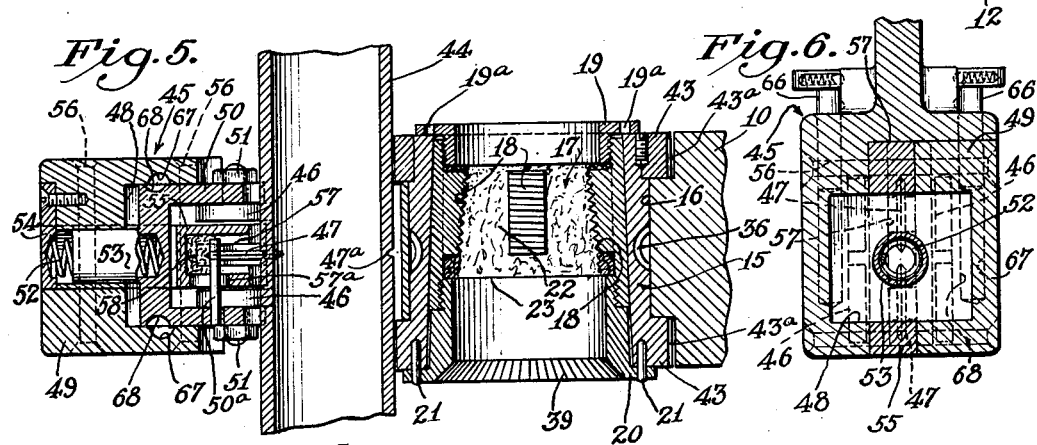
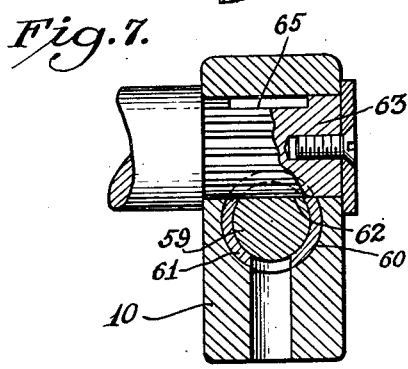
Inventor
Andrew M. Hexdall
BY
Parker, Carlson, Pitzner & Hubbard
Attorneys.

Patented Apr. 2, 1940

2,195,568

UNITED STATES PATENT OFFICE 2,195,568

MULTIPURPOSE TOOL

Andrew M. Hexdall, Morris, Ill.

Application June 25, 1938, Serial No. 215,943

6 Claims. (Cl. 10—87)

The invention relates to multi-purpose tools and more particularly to tools of this type for performing any one of a number of different operations on pipes or the like. It should be understood that the term "pipe" as used herein is intended to embrace tubing and rods, shafts and similarly shaped generally cylindrical articles.

The general object of the present invention is to provide a power driven tool adapted to thread, ream or cut pipes and also to be used as a wrench, such tool being of simple and compact construction.

Another object of the invention is to provide a multi-purpose tool of the type described which is thoroughly portable in character and embodies a self-contained power actuating unit.

Still another object of the invention is to provide a tool of the type described embodying a power-driven rotatable sleeve fashioned to support a threading die on its interior and to provide a friction roller surface on its exterior so that a pipe may alternatively be inserted into the sleeve to thread it or pressed against the sleeve periphery to rotate the pipe as, for example, in performing a cutting operation on the pipe.

The invention also resides in various structural improvements in the clamping mechanism of the tool.

Further objects and advantages of the invention will become apparent as the following description proceeds taken in connection with the accompanying drawings, in which:

Figure 1 is a side elevation partly in section of a portable tool embodying the invention;

Figs. 2 and 3 are, respectively, top and end elevations of the tool shown in Fig. 1;

Fig. 4 is an enlarged vertical longitudinal sectional view of a portion of the tool shown in Fig. 1;

Figs. 5 and 6 are, respectively, horizontal and vertical transverse detail sectional views along the lines 5—5 and 6—6 in Fig. 4;

Fig. 7 is a detail transverse sectional view along the line 7—7 in Fig. 4.

The invention has been shown herein as embodied in a portable tool designed for use particularly by plumbers, steam fitters and other mechanics. It is adapted to perform any one of a number of operations such as pipe threading, reaming or deburring and cutting, and may also be used as a wrench. Because of its extreme compactness and portability it may be readily carried to and used at the work site. The illustrative construction (Fig. 1) embodies an elongated body casting 10 terminating in a round outer end 11 to which is suitably secured an electric driving motor 12 enclosed by a cup shaped casing. The walls of the body 10 are fared into the contour of the motor casing to give the tool a pleasing appearance. A U-shaped handle 13 secured to the outer end of the motor casing enables the operator to support the tool while in use and also makes it handy to carry. By arranging the parts in the general manner shown, the tool can be readily used by either a right or left handed operator. A finger operated switch 14 on the handle 13 serves to control the electric driving motor 12. Current may be supplied to the motor through a suitable flexible cable (not shown).

In order to accommodate the tool for threading the exterior surface of pipes or the like, a set of threading dies is provided which are arranged to be driven by the motor 12. This threader element of the tool comprises a ring or sleeve 15 (Figs. 4 and 5) journaled in a transverse bore 16 in the outer end of the body member 10. The interior of the sleeve 15 is tapered axially to receive a removable complementally tapered annular die member 17 having the usual segmental tapered thread cutting teeth 18 thereon. The die member 17 is held in position within the sleeve 15 by means of a pair of opposed threaded locking rings 19 and 20 (Fig. 5). Pins 21 engaging the sleeve 15 prevent rotation of the ring 20 with respect to it after the ring has been screwed into place. Waste 22 saturated with oil is preferably placed in a recess 23 in the die member 17 intermediate its ends and surrounding the die teeth so as to lubricate the surface of the pipe being threaded. The burrs formed on the pipe by the threading die engage the waste and force lubricant into the pipe surface. Die members 17 of different interior diameter are used for pipes of correspondingly different diameter. In removing the member 17 for replacement, the ring 19 is removed, a wrench engaging holes 19ª in its outer face being used for that purpose. Then by lightly tapping the exposed end of the die member 17, it together with the ring 20 are slid out of the sleeve 15.

Power is supplied for rotating the die holding sleeve or ring 15 through a suitable drive connection from the electric motor 12. In the illustrative construction this drive connection includes a speed reduction gearing disposed within a chamber 24 cored out of the body casting 10 (Fig. 4). In this gearing a pinion 25 on motor shaft 26 meshes with a gear 27 fast with a pinion 28 on a jack shaft 29. This pinion 28 in turn meshes with a gear 30 on a second jack shaft 31 which also meshes with a pinion 32 on a transmission shaft 33. The shafts may be journaled in suitable sleeve bearings provided in the body casting 10 and a retaining plate 34 which covers the end of the chamber 24. The transmission shaft 33 carries a worm 35 on its outer end meshing with a worm gear 36 formed on the exterior of the sleeve 15. The provision of a worm drive is particularly useful when the tool is being used as a manually operated wrench as is hereinafter described.

In the operation of the tool for cutting exterior threads on a pipe or the like, the end of the pipe to be threaded is inserted into the throat of the threading member 17 (from the lower end as viewed in Fig. 5) and the threading member rotated by the electric driving motor. The length of pipe being threaded may, for example, be supported in a vise and the power operated threader pushed onto the end of the pipe so that the end of the latter passes through the threader in the manner described.

Means has also been provided in the tool for performing metal removing operations on the interior of a pipe. For example, it may be desirable to perform a reaming or deburring operation on the end of a pipe, which has been cut off to a desired length, in order to smooth its inner end edges. For this purpose a cutter head 37 (Figs. 1 and 2) is supported on the base casting 10 in such manner that it may be moved into and out of operative relation with the revolvable power-driven sleeve 15. This cutter head 37 has been shown as being of conical shape for insertion into the end of a pipe. The butt of the head 37 is of frusto-conical shape and is provided with teeth as indicated at 38. A complemental frusto-conical surface with mating teeth 39 is formed on the locking ring 20 secured to the sleeve 15, and is adapted to receive the teeth 38. A bracket arm 40 hingedly supported on the base casting at 41 and secured to the cutter head 37 by a split sleeve clamp 42 supports the cutter head for swinging movement into and out of a position in which the teeth 38 engage the teeth 39.

The cutter head 37 has been shown in its retracted or inoperative position in full lines in Figs. 1 and 2. When it is desired to utilize the cutter head for operating on a pipe the arm 40 is swung in a clockwise direction (as viewed in Fig. 2) until the teeth 38 engage the mating teeth 39. The motor 12 is then started by the switch 14 and the cutter head 37 is thus effectively connected in driving relation with it through the medium of the sleeve 15 and its associated worm drive. The motor driven cutter head 37 may then be inserted in the end of a pipe to ream it out or perform other metal removing operations upon its interior as desired.

In utilizing the tool herein disclosed to cut off various lengths of pipe the electric driving motor 12 is utilized to effect relative rotation between the pipe and a suitable cutter so as to perform a cutting operation about the periphery of the pipe. For this purpose annular flanges 43 are fashioned on the rotatable ring 15 and arranged to project through suitable openings at the end of the base casting 10 (Figs. 1 and 2). Knurled or toothed peripheral surfaces 43ª on the flanges 43 are adapted to engage the periphery of a pipe 44 pressed against the same so as to rotate the pipe when the ring 15 is driven by the electric motor 12.

A manually operable clamping mechanism is preferably provided for pressing the pipe 44 against the knurled surface 43ª on the rotatable sleeve or ring 15. For this purpose a clamping jaw, designated generally by the numeral 45, (Figs. 4 and 5) is provided. Preferably two pairs of rollers 46 are yieldably mounted on this clamping jaw for engagement at spaced points with the pipe 44. A suitable cutter such as the cutting disk 47 (Fig. 5) may be conveniently located between these pairs of rollers. In general the rotatable cutter disk 47 is fixed against bodily movement with respect to the jaw 45 while the rollers 46 are yieldably mounted on it. Consequently when the jaw 45 is pressed toward the pipe 44 the latter is engaged by the cutter disk as well as the rollers 46 and the rollers gradually move back away from the forward edge of the cutter disk as it penetrates the pipe.

The clamping jaw 45 has been shown as being in the form of a generally block-shaped casting having a recess 48 in its forward face. One side of this recess is closed by a retaining plate 49 (Fig. 5). A supporting yoke 50, having a U-shaped horizontal cross-section is guided for endwise movement in the recess 48 and the rollers 46 are rotatably supported on its forwardly projecting legs by pins 51. The roller-supporting yoke 50 is yieldably urged toward the pipe 44 by a helical compression spring 52 located in a tubular extension 53 on the rear face of the yoke 50 and interposed between the bottom of this tubular extension and a retaining plate 54 screwed to the outer face of the jaw block 45.

A U-shaped support 55 for the cutter disk 47 (Figs. 4 and 5) is arranged with its arms lying in a generally vertical plane and embracing the yoke 50. The arms of this U-shaped cutter support are fixed to the jaw 45 by through-bolts 56, which also secure the retaining plate 49 in position thereon. Since the base of the U-shaped cutter support extends vertically through the open end of the roller-supporting yoke 50 it limits the outward movement of the latter under the bias applied by the compression spring 52. The cutter disk 47 is rotatably supported in a slot or recess 57 (Fig. 5) in the outer face of the base part of the U-shaped supporting member 55. This recess 57 may be packed with felt 58 impregnated with lubricating oil for lubricating the edge of the cutter disk during the cutting operation. A pin 50ª (Fig. 5) carried by the roller supporting yoke 50 enters the recess 57 through a slot 57ª in its side and as the yoke is pressed back away from the disk 47 the oil impregnated felt is compressed by the pin 50ª so that lubricant is forced out onto the cutter disk.

The clamping jaw 45 is supported in depending relation from an integral bar 59, which is disposed for axial sliding movement in a bore 60 fashioned in the base casting 10 (Figs. 1 and 4). A suitable sleeve bearing or liner 61 may be provided in this bore. In order to effect movement of the jaw 45 toward and away from the co-operating friction roller flanges 43 on the sleeve 15, rack teeth 62 are cut in the upper surface of the bar 59. A pinion 63, journaled in the base casting 10 meshes with this rack and is rotatable by a manual operating lever 64. This pinion 63 is preferably mutilated as indicated at 65 (Fig. 4) so that the clamping mechanism can be readily adjusted for pipes of different diameters. In this latter operation the untoothed or mutilated section of the pinion is rotated into registry with the rack 62 so that the latter can be freely slid axially in or out until the clamping jaw 45 is positioned at a sufficient distance from the friction roller flanges 43 to receive a pipe of the selected diameter. Thereafter the toothed part of the pinion 63 is used to shift the rack 62 so that the clamping jaw will be moved into clamping engagement with the pipe.

The tool described may be utilized for cutting a free length of pipe. In the course of the cutting operation, the jaw 45 is shifted away from the body of the tool a sufficient distance to receive a pipe, such as the pipe 44. The manual clamping lever 64 is then turned so that the rollers 46 and cutter disk 47 are pressed tightly into engagement with one side of the pipe and the opposite side is forced against the knurled surface 43a on the friction roller flanges 43. The pressure on the manual operating lever 64 is continued throughout the cutting operation. After the pipe has been gripped by the tool in the manner described, the electric driving motor 12 is started so that the sleeve 15 is rotated in a counterclockwise direction (as viewed in Fig. 4) and the knurled surface 43a engaging the pipe 44 accordingly causes it to rotate in a clockwise direction. During this rotation of the pipe its periphery is engaged by the cutter disk 47 which gradually enters it so as to form a cut as indicated at 47a in Fig. 5. As the cutting operation continues the cutter disk 47 is permitted to move deeper into the pipe by virtue of the yieldable mounting of the rollers 46, which are in effect gradually retracted behind the active edge of the cutter disk. The cutting operation is continued until the cutter disk finally achieves the position shown in dot-dash lines in Fig. 5 at which time the pipe is completely severed. Upon the completion of the severing operation the driving motor is stopped and the clamping lever 64 returned to its initial position to disengage the severed portions of the pipe.

The tool herein disclosed is also adapted to be used as a wrench of either the power driven or manually operated type. When used as a wrench the pipe or the like operated upon is clamped in substantially the same position as that described for cutting except that the cutter disk 47 is disposed out of engagement with it. In order to prevent engagement of the cutter disk with the pipe the rollers 46 are shifted to a forwardly projected position in which they are located in front of the active edge of the cutter disk. For this purpose pins 66 are arranged to be pressed into recesses formed by two sets of complemental half round grooves 67 and 68 (Fig. 5) on the opposite sides of the roller supporting yoke 50. When these sets of recesses 67—68 are moved into registry so as to receive the locking pins 66 the rollers 46 are positioned outwardly in front of the active edge of the cutter disk. After the pins 66 have been placed in the registering sets of recesses 67—68 the tool may then be readily used as a wrench. If the pipe or the like to be turned does not require a force in excess of that which can be readily supplied by the driving motor, the tool may be used as a power operated wrench. When so used, the pipe is clamped by the jaw rollers 46 against the knurled flanges 43 by the clamping lever 64. The driving motor 12 is then started by the switch 14 and the sleeve 15 thereby rotated to frictionally drive or rotate the pipe. For such operation the motor 12 is preferably made of the reversing type and the switch 14 conditioned to stop the motor or connect it for rotation in either direction.

In the event that the tool is to be used as a manually operated wrench the pipe is simply clamped between the rollers 46 and knurled flanges 43 on the sleeve 15, as described above, through the application of pressure on the manual clamping lever 64. The whole tool is then rotated as a wrench. The length of the lever arm from the pipe to the handle 13 gives a good leverage for turning. In addition, the sleeve 15 is held against rotation during the use of the tool as a manually operated wrench by the worm and worm gear 35—36, even though no brake is provided on the driving motor. In this connection it will be noted that it is an inherent characteristic of a worm drive that a much greater driving force must be applied to the worm gear to turn the worm than is necessary to effect a drive in the opposite direction from the worm to the worm gear. Accordingly no alteration need be made in the drive connection of the tool to accommodate it for use as a manually operated wrench.

Although a particular embodiment of the invention has been shown and described in some detail for purposes of illustration of its various novel features there is no intention to thereby limit the invention to such embodiment but on the other hand the appended claims are intended to cover all modifications and alternative constructions within the spirit and scope of the invention.

I claim as my invention:

1. A portable tool of the character described comprising, in combination, a body member, a rotatable friction roller carried by said body member and peripherally engageable with a pipe pressed against the same, a clamping jaw slidably supported on said body member for movement toward and away from the periphery of said friction roller, power actuated means carried by said body member for driving said friction roller, and means including a manually operable rack and pinion for moving said jaw toward said friction roller into gripping engagement with a pipe disposed therebetween, said pinion having a mutilated untoothed segment rotatable into registry with said rack to permit initial adjustment of said jaw to accommodate pipes of different diameters.

2. A portable tool of the character described comprising, in combination, a body member, an annular hollow threading die member journaled for rotation on said body member, means including an electric driving motor carried by said body member for rotating said die member, a rotatable conical reamer head, means including mating toothed surfaces on said threading member and said reamer for releasably connecting the same in driving relation, and means hingedly supporting said reamer for swinging movement on said body member into and out of a position in which said mating toothed surfaces are in engagement.

3. A portable tool of the character described comprising, in combination, a rotatable friction roller peripherally engageable with a pipe pressed against the same for rotating the pipe, a clamping jaw arranged in opposed relation to said friction roller, a pair of rollers journaled on the face of said jaw opposed to said friction roller, said pair of rollers being spaced from each other in a direction circumferentially of said friction roller, a cutter carried by said jaw and located intermediate said pair of rollers for engagement with the periphery of a pipe clamped between said pair of rollers and the opposed friction roller, means supporting said jaw and friction roller for relative movement toward and away from each other respectively to grip and release a pipe placed therebetween, and an electric driving motor carried by said last named means and connected in driving relation with said friction roller.

4. A portable tool of the character described comprising, in combination, a rotatable friction roller peripherally engageable with a pipe pressed against the same for rotating the pipe, a clamping jaw arranged in opposed relation to said friction roller, a pair of rollers journaled on the face of said jaw opposed to said friction roller, said pair of rollers being spaced from each other in a direction circumferentially of said friction roller, a cutter carried by said jaw and located intermediate said pair of rollers for engagement with the periphery of a pipe clamped between said pair of rollers and the opposed friction roller, means supporting said pair of rollers for bodily shifting movement from a projected position in which they are projected beyond the active edge of said cutter to a retracted position in which they are located behind the active edge of said cutter, means for yieldably urging said pair of rollers toward their projected position, means supporting said jaw and friction roller for relative movement toward and away from each other respectively to grip and release a pipe placed therebetween, and an electric driving motor carried by said last named means and connected in driving relation with said friction roller.

5. A portable tool of the character described comprising, in combination, a rotatable friction roller peripherally engageable with a pipe pressed against the same for rotating the pipe, a clamping jaw arranged in opposed relation to said friction roller, a pair of rollers journaled on the face of said jaw opposed to said friction roller, said pair of rollers being spaced from each other in a direction circumferentially of said friction roller, a cutter carried by said jaw and located intermediate said pair of rollers for engagement with the periphery of a pipe clamped between said pair of rollers and the opposed friction roller, means supporting said pair of rollers for bodily shifting movement from a projected position in which they are projected beyond the active edge of said cutter to a retracted position in which they are located behind the active edge of said cutter, means for yieldably urging said pair of rollers toward their projected position, means for releasably locking said pair of rollers in their projected position, means supporting said jaw and friction roller for relative movement toward and away from each other respectively to grip and release a pipe placed therebetween, an electric driving motor carried by said last named means and connected in driving relation with said friction roller, and means for holding said friction roller against rotation when said motor is stopped.

6. A portable tool of the character described comprising, in combination, an elongated body structure having an electric driving motor housed therein, a manual supporting handle at one end of said body structure and a transversely extending friction roller journaled in the other end portion thereof, said roller being connected in driven relation with said motor, an L-shaped clamping member disposed with one leg opposed to the periphery of said friction roller and extending transversely of said roller to form a cooperating clamping jaw, the other leg of said L-shaped member being mounted for sliding movement on said body structure in a direction longitudinally of said other leg and of said body structure, and manually operable means including a rack on said other leg and a meshing pinion journaled on said body structure for shifting said L-shaped member to bring said clamping jaw portion thereof into and out of clamping engagement with a pipe inserted between the same and said friction roller.

ANDREW M. HEXDALL.